United States Patent [19]

Miniere

[11] 3,954,047

[45] May 4, 1976

[54] TRANSMISSION COUPLING APPARATUS

[76] Inventor: Jack K. Miniere, 685 Minnesota Ave., Winter Park, Fla. 32789

[22] Filed: Feb. 18, 1975

[21] Appl. No.: 550,355

[52] U.S. Cl. ............................ 91/467; 137/625.21; 251/304; 60/325
[51] Int. Cl.² ........................................ F15B 13/04
[58] Field of Search ............... 60/325; 91/315, 462, 91/467; 137/625.21, 625.46; 251/304

[56] References Cited
UNITED STATES PATENTS

| | | | |
|---|---|---|---|
| 2,952,243 | 9/1960 | Dunning | 91/467 |
| 3,319,531 | 5/1967 | Sanders | 91/467 X |
| 3,397,618 | 8/1968 | Jensen | 91/462 X |

*Primary Examiner*—Edgar W. Geoghegan
*Attorney, Agent, or Firm*—Duckworth, Hobby & Allen

[57] ABSTRACT

A hydraulic or pneumatic coupling including a hydraulic or pneumatic pump and a hydraulic or pneumatic motor driven by the pump through a coupling has two pairs of adjacent chambers divided and connected by a rotatable valve element which allows the varying of speed and direction of the motor. The coupling forms the key element to a hydraulic or pneumatic actuated transmission.

4 Claims, 5 Drawing Figures

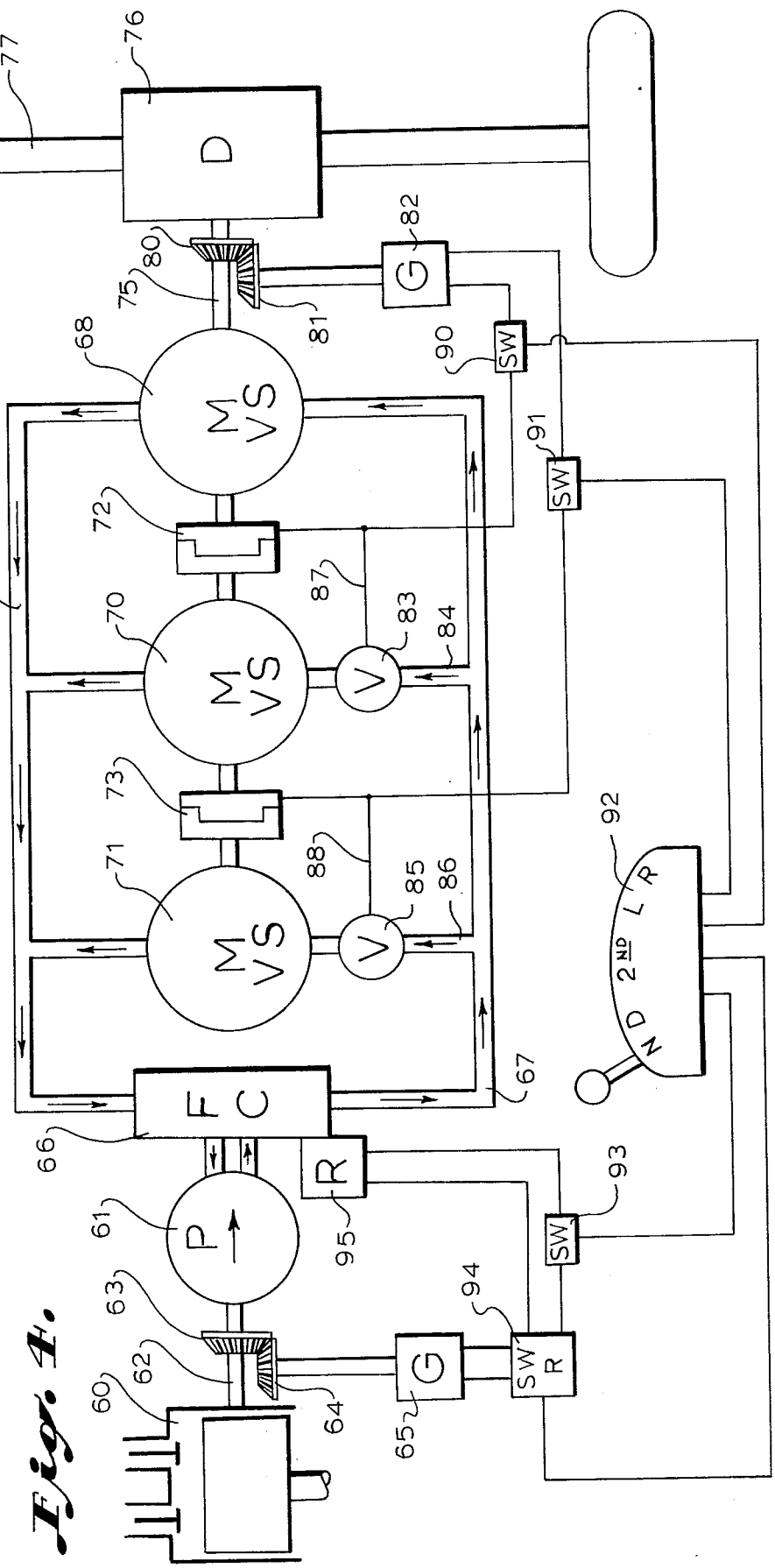
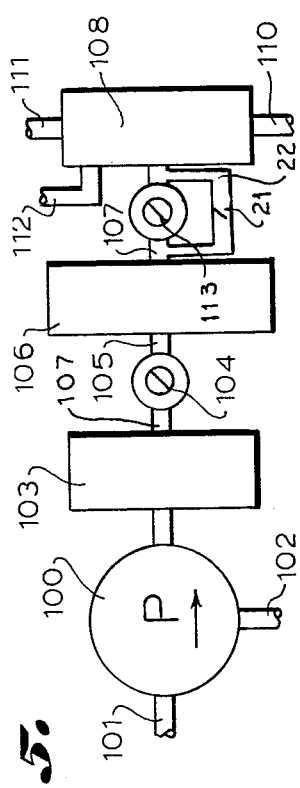
Fig. 5.
Fig. 4.

3,954,047

TRANSMISSION COUPLING APPARATUS

BACKGROUND OF THE INVENTION

The present invention relates to hydraulic and pneumatic couplings and transmissions for coupling a hydraulic or pneumatic pump to a fluid motor for varying the speed and direction of the fluid motor relative to the pump driving the motor.

In the past a great variety of fluid operated drive systems and transmissions have been provided. Generally these systems connect a hydraulically operated motor having turbines, and the like, which are rotated by a fluid under pressure passing through the motor. Fluid pressure is generally generated by some type of pump which may be driven by an electric motor or by any other source desired. The speed of the hydraulic motor can be varied by varying the flow of hydraulic fluid, by controlling the pump or the pump actuating means or it can, alternatively, be controlled by varying elements of the pump, such as the blades in the pump or a bleed to pass a portion of the fluid so as to reduce the amount of work being done by the hydraulic fluid. Other types of valves have also been utilized to control the rotation of the hydraulic motor. Valves come in a great variety of configurations and styles for controlling the flow of all types of fluids including stopping and starting the flow of fluid, as well as varying the rate of flow. Hydraulic transmissions of various types have also been provided in the past. These include the standard automobile transmission which connects a torque converter for fluid coupling of some type to a planetary gear system for shifting the gear ratio of the drive unit. In addition, hydro-transmissions have been provided which provide a hydraulic coupling which controls the angle of blades on either the driving pump or the driven hydraulic motor.

The present invention provides a simplified coupling which, advantageously, provides great flexibility and control of a hydraulic or pneumatic coupling which conveniently fits into a fluid transmission which can vary the torque and speed of the drive in a convenient and easily manufactured transmission.

SUMMARY OF THE INVENTION

A hydraulic or pneumatic coupling and transmission is provided in which a pump having inputs and outputs drives a fluid motor having inputs and outputs and in which the pump is connected through a fluid coupling to the fluid motor. The coupling has two pairs of adjacent chambers, each pair of chambers being divided along an axis perpendicular to the dividing of the other pair and being separated from each other by a rotatable control member having a plurality of openings therethrough which may be rotated to operatively connect different chambers between said pairs of chambers. This fluid coupling is connected between an engine driven fluid pump and a plurality of fluid motors where the plurality of fluid motors are each connected to the input and output of the fluid coupling. A magnetic clutch is connected between each of said plurality of motors for engaging one motor to the next when actuated. Valves are connected to engage or disengage each of the motors except one upon actuation and governors are connected to the input and output of the transmission to automatically engage or disengage the motors other than the first. A pneumatic coupling has air tanks for storing air under pressure for driving a pneumatic transmission indirectly by the stored air.

BRIEF DESCRIPTION OF THE DRAWINGS

Other objects, features and advantages of the present invention will be apparent from the written description and the drawings in which:

FIG. 4 is a diagrammatic view of a fluid transmission in accordance with the present invention; and FIG. 5 is a diagrammatic view of a pneumatic coupling utilizing air pressure tanks for use in the transmission of FIG. 4.

DESCRIPTION OF THE PREFERRED EMBODIMENT

Figure 1:
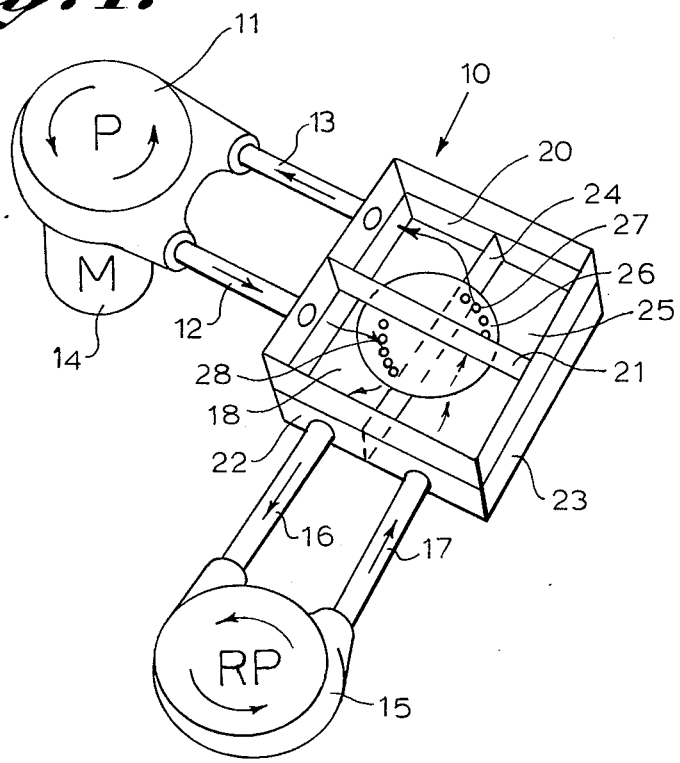
FIG. 1 is a perspective diagrammatic view of the coupling coupled between a pump and motor.

Referring now to FIG. 1, a hydraulic coupling 10 is illustrated connecting to a hydraulic pump 11 by an input line 12 and an output line 13. The hydraulic pump 11 is driven by an electric motor 14 but of course can be driven in any means desired without departing from the spirit and scope of the invention. The hydraulic coupling 10 is also coupled to a hydraulic motor 15 through an input line 16 and an output line 17. This actuation of the pump 11 will drive the motor 15 through the coupling 10 in accordance with the direction of flow of the fluid in the output line 12 of the pump 11 and is connected into a chamber 18 and the input line 13 of the pump 11 is connected into a chamber 20. Chambers 18 and 20 are divided by dividing wall 21 and run parallel to each other. The input 16 of the motor 15 is connected to a chamber 22 while the output 17 of the motor 15 is connected into a chamber 23. Chambers 22 and 23 are divided by wall 24 and run parallel to each other but perpendicular to the chambers 18 and 20 and their dividing wall 21. Chambers 18 and 20 are adjacent the chambers 22 and 23 and are divided from each other by a dividing wall 25 and also by a rotating dividing element 26. The element 26 has a plurality of openings 27 and a plurality of openings 28 which will connect selected chambers 18 and 20 with chambers 22 and 23 and which allows chambers to be selectively connected including the openings 27 connecting two of one chamber to one of another and the openings 28 connecting one pair of chambers to one of the other pair of chambers. This allows the speed to be varied by the rotatable element 26 being rotated and positioned to overlap the chamber dividing sections 24 or 21 with the openings 27 and 28 and to continue the rotation for a complete reversing of the direction of the fluid entering the motor 15, while the pump 11 continues to drive the fluid in the same direction as in FIG. 2. When holes 27 and 28 are centered over either wall 21 or wall 24 the flow in 16 and 17 is neutralized and therefore the coupling is used as a clutch since 15 would be at a standstill. It could clutch in either direction of motor operation. It should be clear to those skilled in the art that while the system is described as hydraulic, it applies equally as well to a pneumatic system.

Figure 2:
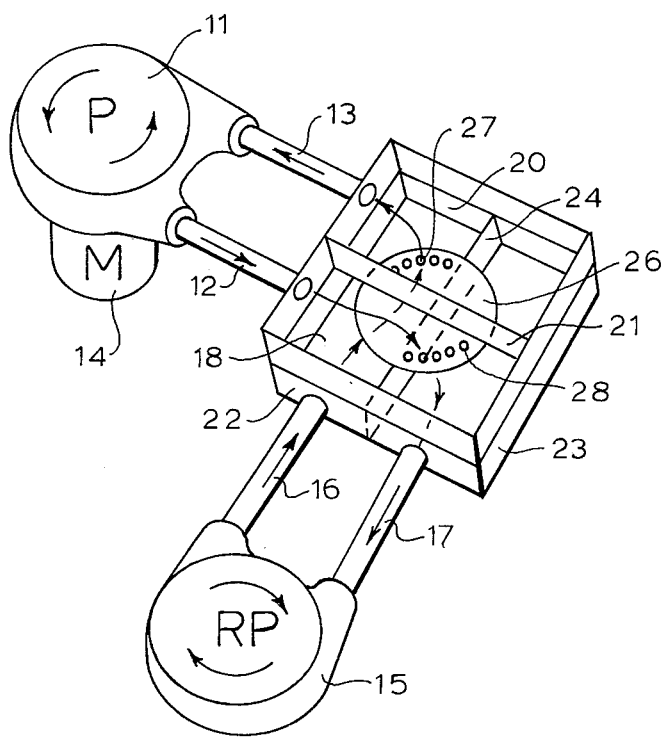
FIG. 2 is a perspective view of the invention in accordance with FIG. 1 with the couplings rotated to provide the reverse flow through the motor.
Figure 3:
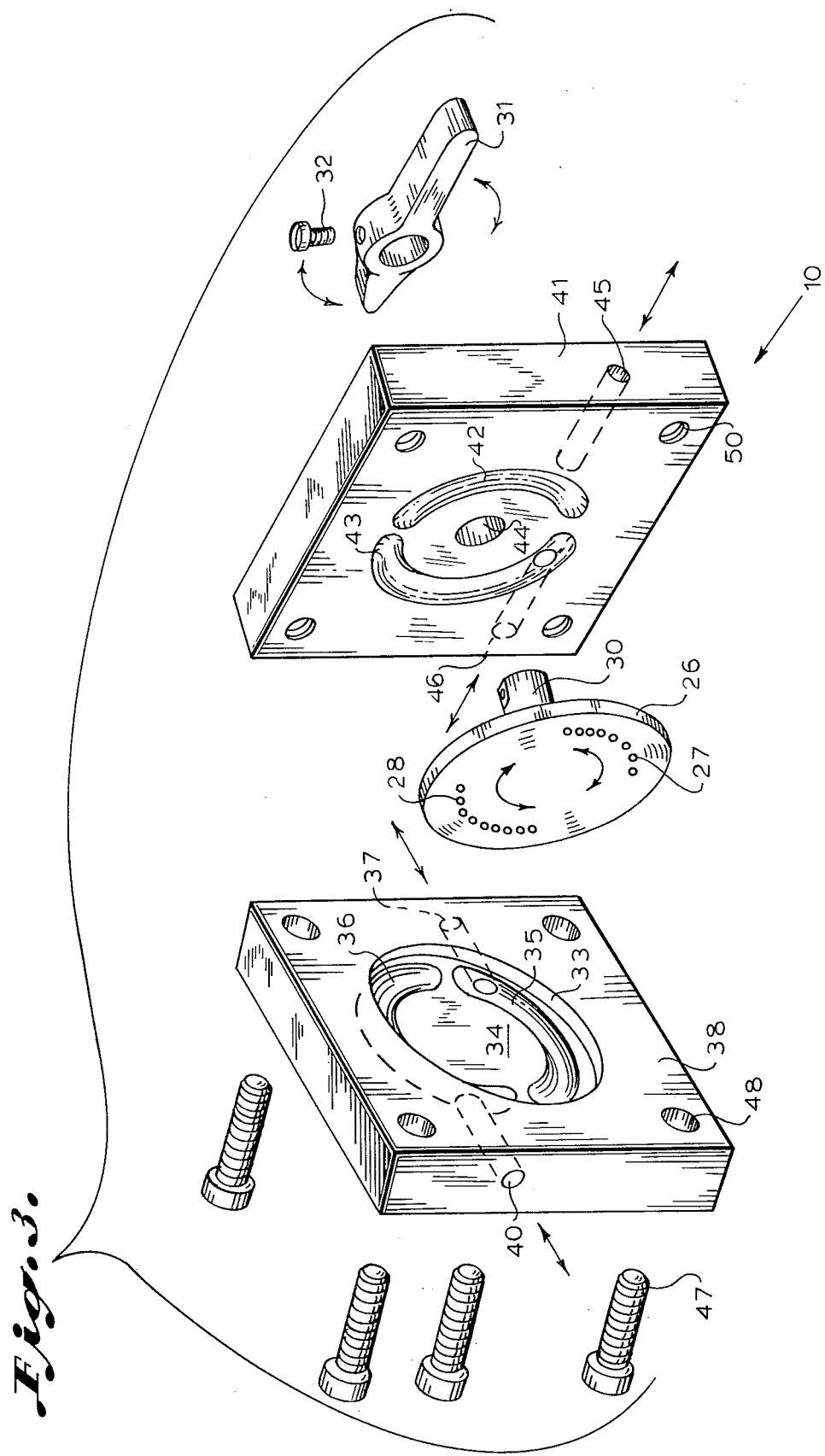
FIG. 3 is an exploded perspective view of a coupling in accordance with the present invention.

While rectangular shaped chambers 18 and 20 and 22 and 23 are illustrated in FIGS. 1 and 2 for illustrative purposes, FIG. 3 illustrates a more accurate embodiment of the shape of the chambers and hydraulic coupling 10 which has been exploded to illustrate the rotatable valve element 26 having the plurality of openings 27 and 28 but also having an extended arm 30 from the disc 26 for rotating the disc 26 with a handle 31 held to the disc 30 by set screws 32. The coupling member 26 fits into a disc-shaped recessed area 33 having a bottom 34 and portions of arcuate chambers 35 and 36, chamber 35 having an opening 37 passing to the exterior of the main casing 38 and chamber 36 housing an opening 40 passing from the chamber 36 through the casing 38. Casing 38 is the lower casing while the upper casing portion 41 has a chamber 42 and a chamber 43 which are arcuate shaped and also has an opening 44 for the control arm 30 to pass through. Chamber 42 has an opening 45 passing therefrom through the upper casing 41 while chamber 43 has a passageway 46 passing therefrom through the upper casing 41 to the exterior of the coupling. The casings 38 and 41 are bolted together by a plurality of bolts 47 which pass through a plurality of openings 48 passing through the lower casing 38 and into the threaded openings 50 of the upper casing 41 for bolting the upper and lower casings together with the member 26 therebetween fitting in the recessed area 33. The chambers 42 and 43 are bolted over the chambers 35 and 36 so that an area dividing each pair of chambers runs in a generally perpendicular direction to the same dividing portion of the chambers 35 and 36, in accordance with the configurations of FIGS. 1 and 2. Thus, passageways 45 and 46 can connect to the pump lines 12 and 13 while passageways 37 and 40 can connect to the motor connecting lines 16 and 17 of FIGS. 1 and 2. The handle 31 can be rotated to vary the flow of fluid between the channels entering and leaving the passageways 45, 46, 37 and 40 for varying the speed of the rotating hydraulic motor 15 of FIGS. 1 and 2 and for the reversing of the direction of operation thereof.

Turning now to FIG. 4, the operation of the hydraulic coupling is placed in a hydraulic transmission as illustrated in whih an engine 60 drives a hydraulic pump 61 through a shaft 62 which has a beveled gear 63 connected thereto for driving a beveled gear 64 which drives an engine governor 65. The pump 61 pumps fluid through a hydraulic coupling 66 in accordance with the coupling described in FIGS. 1 through 3 which is connected on one side by a hydraulic line 67 connected to a first hydraulic motor 68, a second hydraulic motor 70 and a third hydraulic motor 71. Hydraulic motors 68 and 70 are connected by a magnetic clutch or other clutching arrangement 72 while motors 70 and 71 are connected by magnetic clutch 73. Each of the motors 68, 70 and 71 are connected to a return hydraulic fluid line 74 to the hydraulic coupling 66 to provide a complete circuit of flow for the fluids. The first hydraulic motor 68 is connected to a drive output shaft 75 and to a differential 76 which drives an axle 77 and wheels 78. Shaft 75 has a beveled gear 80 connected thereto which drives a beveled gear 81 which in turn drives a governor 82. The motor 70 has a valve 83 connected in a line 84 which connects the hydraulic line 67 to the motor 70 while the hydraulic motor 71 has a valve 85 connected in a line 86 which connects the line 67 to the hydraulic motor 71. These valves may be solenoid actuated valves for opening or closing the lines 84 and 86 respectively to turn motors 70 and 71 off upon control of an electrical signal. Valve 83 is controlled through an electric line 87 while the valve 85 is controlled through an electric conductor 88. Conductor 88 also is connected to the magnetic coupling 73 while the conductor 87 is connected to the hydraulic coupling 72, so that actuation of the valve 83 to open line 84 to start the motor 70 rotating by the flow of hydraulic fluid therethrough simultaneously actuates the magnetic clutch 72 to connect motor 68 and 70. Similarly, actuation by electrical signal of the valve 85 will simultaneously actuate magnetic clutch 73 to simultaneously start the motor 71 running by the flow of fluid thereto while simultaneously connecting motors 71 and 70. Motor 68 is connected directly to the differential 76. When magnetic clutches 73 and 72 are engaged, all three motors 71, 70 and 68 work as a unit and give an approximate power ratio of 3 to 1 to the rear wheels, such as in low gear in a regular transmission. The fluid coupling 66 is in neutral while the engine idles, but is automatically closed to direct the fluid in a direction to move the wheels forward when 92 is in drive position, as the engine speed is increased. When the wheel speed reaches a predetermined speed, motor 71 is disengaged leaving 70 and 68 to work as a single unit, with about a 2 to 1 power ratio (second gear in a conventional car). At a higher predetermined speed, motor 70 disengages leaving only motor 68 driving the vehicle at high speed. When the shift control 92 is in "L" position, all three motors are engaged. When shift control 92 is in "2nd" position, only motor 71 is disengaged at a predetermined speed and motors 70 and 68 stay engaged. In "D" and 2nd positions on the shift control 92 the motor would re-engage as the speed was reduced. When the shift control 92 is in the "R" position, coupling 66 is turned to the reverse position and all three motors stay engaged as coupling 66 again goes from neutral to closed position as the engine speed increases but the fluid is directed in the opposite direction through line 74 and from there through the motors revolving them in the opposite direction from the forward speeds. When the coupling 66 is centered between forward and reverse, it acts as a clutch as heretofore explained in connection with FIGS. 1 and 2. The fluid then returns through line 67 which in this case is the return line and completes the circuit. A switch 93 is connected to the governor 65 and to switch 94. The control provided through the shift control 92 allows the switch 93 to actuate the hydraulic coupling 66 in a reverse direction while the governor 65 is connected through switch 94 to the shift control 92 so as to prevent switching into reverse direction while the vehicle is moving forward. Thus, an operator of the transmission can shift the transmission from neutral to reverse and also through a low, second and drive position by varying the direction of flow of fluid through the coupling 66 and thereby through the motors. Hydraulic motors 70 and 71 can be shifted into engagement to provide additional torque to the drive shaft 75 through the magnetic couplings 72 and 73. In the drive position the unit can provide for the governor 82 to switch solenoid valves 83 and 85 in or out to actuate hydraulic motors 70 and 71 at predetermined speeds. A fluid coupling regulator 95 is also provided for electrically rotating with a rotatable solenoid, or the like, the flow of fluid through the coupling 66 on command of electrical signals.

The transmission and engine drive arrangement as illustrated in FIG. 4 can be modified as illustrated in the diagrammatic view of FIG. 5 in whih the pump and drive motors and system are converted to a pneumatic or air system having an air pump 100 driven by a drive shaft 101 driven by an internal combustion or other engine and pumping air in from a line 102. The pump 100 compresses air in an air tank 103 at a relatively high pressure. A regulator valve 104 releases air into tank 106 which maintains a much lower pressure than tank 103. Air is replenished to tank 106 from tank 103 and kept at a nearly constant working pressure. The air pressure is applied through an air line 107 to a coupling 108 which is similar to the coupling 66 of FIG. 4 except for operating with air pressure and feeds the air through lines 110 and 111 similar to lines 67 and 74 of FIG. 4 which drive a plurality of air motors not illustrated but identical to motors 68, 70 and 71 and connected with magnetic couplings 72 and 73 in the same manner as previously described. Intake and exhaust port 112 allows air at atmospheric pressure to be fed into and out of the pneumatic coupling 108. The system requires an air metering valve 113 which is used as a throttling device to regulate the amount of air going to coupling 108. This system has the advantage of allowing a smaller engine 60 to drive the pump 100 in a generally continuous operation while storing energy in the form of compressed air in the tanks 103 and 106. The compressed air advantageously provides stored energy for acceleration of the vehicle thereby reducing the great waste of fuel when the car engine is idling and at a standstill in traffic. The engine will automatically stop when the tanks are fully charged and will start again only when the pressure in the tanks falls below a predetermined point.

An added advantage is that when braking a vehicle, the momentum of the car can be used to create power in the form of stored compressed air. That is, by adding a device to the brake pedal that reverses coupling 108, air woulld be forced to enter port 112 and the transmission motors will pump air through bypass 22 and only way valve 21 back into tank 106. In stop and go traffic, this would conserve energy.

It should be clear at this point that a hydraulic or pneumatic transmission is provided which is simple in operation and yet provides a convenience of forward and reverse directions, automatic operation and a forward direction to provide different speed ranges. It can be easily overridden and can be easily repaired and modified for a great variety of operations. It should also be clear that a hybrid pneumatic drive system using compressed air has been provided for reducing and conserving the fuel necessary to operate a vehicle. This invention, however, is not to be construed as limited to the particular forms disclosed herein since these are to be regarded as illustrative rather than restrictive.

I claim:

1. A fluid coupling comprising in combination:
    a fluid pump having an input and output;
    a fluid motor having an input and an output;
    coupling means coupling said fluid pump to said fluid motor whereby pressurized fluid from said fluid pump can drive said fluid motor;
    coupling means having a first pair of chambers and a second pair of chambers separated by a rotatable chamber separating control member, said control member having a plurality of openings therethrough at predetermined locations thereby interconnecting at least one first and second chamber; and
    said fluid pump input operatively connected to one first chamber and said fluid pump output operatively connected to the other first chamber and said fluid motor input being operatively connected to one said second chamber and said fluid motor output being operatively connected to said other second chamber whereby pressurized fluid from said pump drives said motor through said coupling means.

2. The apparatus in accordance with claim 1 in which said first pair of chambers and said second pair of chambers are arcuate shaped chambers.

3. The apparatus in accordance with claim 2 in which said chambers separating control member has two sets of openings each arcuately located at the same arc as said first and second pair of chambers.

4. The apparatus in accordance with claim 3 in which said chambers are mounted in a casing having a disc shaped recessed area between said chambers filled with said rotatable chamber separating control member and an opening passing through said casing to the center portion of said recessed area having an arm extending thereinto and attached to said rotatable chamber separating control member whereby rotation of said arm will rotate said chamber member for controlling flow through said coupling.

* * * * *